US010792892B2

(12) United States Patent
Siemen et al.

(10) Patent No.: US 10,792,892 B2
(45) Date of Patent: Oct. 6, 2020

(54) USE OF AN ALUMINIUM ALLOY OR OF AN ALUMINIUM FLAT PRODUCT MADE FROM AN ALLOY OF THIS TYPE FOR AN ALUMINIUM-PLASTIC COMPOSITE PART

(71) Applicants: Andreas Siemen, Jüchen (DE); Volker Denkmann, Kempen (DE)

(72) Inventors: Andreas Siemen, Jüchen (DE); Volker Denkmann, Kempen (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 15/397,330

(22) Filed: Jan. 3, 2017

(65) Prior Publication Data

US 2017/0113439 A1 Apr. 27, 2017

Related U.S. Application Data

(63) Continuation of application No. PCT/EP2015/065670, filed on Jul. 9, 2015.

(30) Foreign Application Priority Data

Jul. 9, 2014 (EP) .................................. 14176390

(51) Int. Cl.
| | | |
|---|---|---|
| *B32B 15/08* | (2006.01) | |
| *C22C 21/00* | (2006.01) | |
| *B32B 15/20* | (2006.01) | |
| *B32B 7/12* | (2006.01) | |
| *B32B 27/32* | (2006.01) | |
| *B32B 27/30* | (2006.01) | |
| *B32B 27/34* | (2006.01) | |
| *B32B 27/36* | (2006.01) | |

(52) U.S. Cl.
CPC .............. *B32B 15/08* (2013.01); *B32B 7/12* (2013.01); *B32B 15/20* (2013.01); *B32B 27/302* (2013.01); *B32B 27/304* (2013.01); *B32B 27/308* (2013.01); *B32B 27/32* (2013.01); *B32B 27/34* (2013.01); *B32B 27/365* (2013.01); *C22C 21/00* (2013.01); *B32B 2255/06* (2013.01); *B32B 2255/26* (2013.01); *B32B 2307/102* (2013.01); *B32B 2307/50* (2013.01); *B32B 2307/54* (2013.01); *B32B 2605/08* (2013.01)

(58) Field of Classification Search
CPC ......... C22C 21/00; C22C 45/08; B32B 15/06; B32B 15/08–098; B32B 15/14; B32B 15/20

See application file for complete search history.

(56) References Cited

U.S. PATENT DOCUMENTS

| | | | | | |
|---|---|---|---|---|---|
| 4,483,719 | A | * | 11/1984 | Furrer .................. | C22F 1/04 148/437 |
| 4,671,985 | A | * | 6/1987 | Rodrigues ............... | B29C 53/04 428/215 |
| 6,468,613 | B1 | * | 10/2002 | Kitano .................... | B32B 15/08 428/35.8 |
| 2004/0209092 | A1 | * | 10/2004 | Near ....................... | B32B 15/04 428/472.2 |
| 2011/0165015 | A1 | * | 7/2011 | Howells ............... | B22D 11/003 420/548 |
| 2015/0203941 | A1 | * | 7/2015 | Seki ..................... | H01M 2/0285 429/176 |
| 2016/0159541 | A1 | * | 6/2016 | Brandl ................... | B65B 61/06 206/461 |
| 2017/0225428 | A1 | * | 8/2017 | Muir ........................ | B32B 5/18 |

FOREIGN PATENT DOCUMENTS

| | | |
|---|---|---|
| CN | 101248199 A | 8/2008 |
| CN | 101724770 A | 6/2010 |
| CN | 102206775 A | 10/2011 |
| CN | 102978484 A | 3/2013 |
| DE | 603 20 387 T2 | 8/2008 |
| EP | 0 486 427 A1 | 5/1992 |
| EP | 1 074 636 A1 | 2/2001 |
| EP | 3 019 415 | 1/2015 |
| EP | 2 881 478 A1 | 6/2015 |
| JP | 2001-288525 A | 10/2001 |
| JP | 2002-038234 A | 2/2002 |
| JP | 2002096419 A * | 4/2002 |
| JP | 2004-027353 A | 1/2004 |
| JP | 2005-056729 A | 3/2005 |
| JP | 2012-052158 A | 3/2012 |
| WO | WO 2012/036181 A1 | 3/2012 |
| WO | WO 2014/021170 A1 | 6/2014 |
| WO | WO 2015/004134 A1 | 1/2015 |

OTHER PUBLICATIONS

The American Association, Registration Record Series Teal Sheets, International Alloy Designations and Chemical Composition Limits for Wrought Aluminum and Wrought Aluminum Alloys, 2015, p. 13.*

(Continued)

*Primary Examiner* — Monique R Jackson
(74) *Attorney, Agent, or Firm* — Reinhart Boerner Van Deuren P.C.

(57) ABSTRACT

The invention relates to the use of an aluminium alloy for an aluminium-plastic composite part or for the production thereof, wherein the aluminium alloy has the following composition: Si: 0.05-0.35 wt. %, Fe: 1.3-1.75 wt. %, Cu:≤0.02 wt. %, Mn: 0.015-0.035 wt. %, Mg:≤0.003 wt. %, Cr:≤0.03 wt. %, Ni:≤0.02 wt. %, Zn:≤0.03 wt. %, Ti:≤0.03 wt. %, contaminants individually up to 0.05 wt. %, in total up to 0.15 wt. %, the remainder being aluminium. The invention further relates to the use of an aluminium sheet product made from an alloy of this type for an aluminium-plastic composite part or the manufacture thereof. Finally, the invention also relates to an alloy of this type and to an aluminium sheet product made from an alloy of this type.

20 Claims, No Drawings

(56) References Cited

OTHER PUBLICATIONS

Machine translation of JP2002096419A published Apr. 2002.*
Technical Data Sheet for ALUBIS(RTM) 45 by SVAM Packaging Industries Pvt. Ltd., Dec. 2011, downloaded from svam.in (Year: 2011).*
Davis, Aluminum and Aluminum Alloys, Alloying: Understanding the Basics, 2001, ASM International, pp. 351-416. (Year: 2001).*
The Aluminum Association, "International Alloy Designations and Chemical Composition Limits for Wrought Aluminum and Wrought Aluminum Alloys", Registration Record Series Teal Sheets, revised Feb. 2009, 38 pages.

* cited by examiner

USE OF AN ALUMINIUM ALLOY OR OF AN ALUMINIUM FLAT PRODUCT MADE FROM AN ALLOY OF THIS TYPE FOR AN ALUMINIUM-PLASTIC COMPOSITE PART

CROSS-REFERENCE TO RELATED PATENT APPLICATION

This patent application is a continuation of PCT/EP2015/065670, filed Jul. 9, 2015, which claims priority to European Application No. 14176390.4, filed Jul. 9, 2014, the entire teachings and disclosure of which are incorporated herein by reference thereto.

FIELD OF INVENTION

The invention relates to the use of an aluminium alloy for an aluminium-plastic composite part. The invention further relates to the use of an aluminium flat product made from an alloy of this type for an aluminium-plastic composite part. The invention further relates to an alloy of this type as well as an aluminium flat product made from an alloy of this type.

BACKGROUND OF INVENTION

Aluminium-plastic composite parts may in particular be used in the automotive industry as lightweight components, for example in order to replace heavier steel modules.

In the automotive industry, in particular for applications concerning automobile underbodies, aluminium foils made from alloys that are as pure as possible, for example of the type AA1050 are used especially as a cover layer for heat shields which are laminated with a plastic foil as a bonding agent. The aluminium foils are generally used that have calottes or perforations.

In the case of newer composite parts, aluminium foils are also used in order to achieve certain functionalities of the composite part such as for example with respect to the stiffness or the acoustic insulating properties.

While substantially flat aluminium-plastic composite parts were initially used in the automotive industry, development moved to produce aluminium-plastic composite parts with increasingly more complex geometries. The production of aluminium-plastic composite parts of this type thus requires forming steps with in part high degrees of forming.

It was found that the aluminium alloys used hitherto for such high degrees of forming are only suitable to a limited extent such that the achievable component geometries are restricted.

BRIEF SUMMARY OF THE INVENTION

Proceeding from here, the object underlying the present invention is to provide an aluminium alloy or an aluminium flat product made from an aluminium alloy of this type for aluminium-plastic composite parts or the production thereof by means of which also complex component geometries can be achieved with advantageous mechanical properties.

This object is achieved according to the invention by an aluminium alloy, wherein the aluminium alloy has the following composition:
Si: 0.05 to 0.35 wt. %
Fe: 1.3 to 1.75 wt. %, preferably 1.3 to 1.7 wt. %, in particular 1.6 to 1.7 wt. %.
Cu: ≤0.02 wt. %, preferably≤0.01 wt. %,
Mn: 0.015 to 0.035 wt. %, preferably 0.025 to 0.034 wt. %,
Mg: ≤0.003 wt. %, preferably≤0.001 wt. %,
Cr: ≤0.03 wt. %, preferably≤0.02 wt. %,
Ni: ≤0.02 wt. %,
Zn: ≤0.03 wt. %,
Ti: ≤0.03 wt. %,
Impurities individually up to 0.05 wt. %, preferably up to 0.02 wt. %, in total up to 0.15 wt. %, preferably up to 0.06 wt. %, the remainder being aluminium.

The object is further achieved according to the invention by an aluminium flat product made from an alloy of this type.

This object is further achieved according to the invention by the use of an aluminium alloy for an aluminium-plastic composite part or the production thereof, wherein the aluminium alloy has the following composition:
Si: 0.05 to 0.35 wt. %
Fe: 1.3 to 1.75 wt. %, preferably 1.3 to 1.7 wt. %, in particular 1.6 to 1.7 wt. %.
Cu: ≤0.02 wt. %, preferably≤0.01 wt. %,
Mn: 0.015 to 0.035 wt. %, preferably 0.025 to 0.034 wt. %,
Mg: ≤0.003 wt. %, preferably≤0.001 wt. %,
Cr: ≤0.03 wt. %, preferably≤0.02 wt. %,
Ni: ≤0.02 wt. %,
Zn: ≤0.03 wt. %,
Ti: ≤0.03 wt. %,
Impurities individually up to 0.05 wt. %, preferably up to 0.02 wt. % in total up to 0.15 wt. %, preferably up to 0.06 wt. %, the remainder being aluminium.

It was surprisingly found that a very well formable alloy is achieved by the high Fe content with correspondingly selected Si contents and minimised Mg content which is particularly suitable for aluminium-plastic composite parts or the production thereof. The previously described alloy in particular has a higher elongation at break A100 than the alloys EN AW-1050-A or EN-AW 1200 commonly used in automotive engineering and thus offers better formability. The previously described alloy at the same time has good corrosion resistance and is easy to process.

The high elongation at break and thus the good formability of the alloy is in particular achieved by the quite high Fe content in the range of 1.3 to 1.75 wt. %, preferably from 1.6 to 1.7 wt. %, wherein a better microstructure may be achieved with a preferred Fe upper limit of 1.7 wt. %. Good corrosion behaviour is at the same time achieved by the required Si content in the range of 0.05 to 0.35 wt. %. Greater strength of the alloy may be achieved by the Mn content, but at the expense of processability since higher Mn contents in the alloy lead to a greater softening in the case of temperature increase, i.e. to a steeper softening curve as a function of the temperature such that a selective heat treatment of the alloy is difficult. A good compromise is achievable here with the claimed Mn content in the range of 0.015 to 0.035 wt. %, preferably from 0.025 to 0.034 wt. %.

The above-mentioned object is also achieved according to the invention by the use of an aluminium flat product made from the previously described alloy for an aluminium-plastic composite part or the production thereof.

An extremely deformable aluminium flat product is thereby provided which has very good forming properties and may thus be formed when producing the composite part for example together with plastic layers. It is in particular possible to form the composite part or preforms of this composite part during the production as a whole.

The previously described alloy or the aluminium flat product made from an alloy of this type are thus preferably used for production processes of aluminium-plastic composite parts which have at least one forming step, in particular a forming step which requires an elongation at break A100 of the aluminium flat product of more than 30%.

An aluminium-plastic composite part is understood here as a composite part which has at least one aluminium element such as for example an aluminium layer and at least one plastic-containing element such as for example a plastic-containing layer.

The plastic-containing element, in particular the plastic-containing layer, preferably comprises a thermoplastic plastic as binder. In addition to the plastic, the plastic-containing element or the plastic-containing layer may also comprise further additives such as for example inorganic fillers or fibres.

Further embodiments of the previously mentioned alloy, of the aluminium flat product as well as of the previously mentioned uses are described below, wherein the individual embodiments can be combined with each other as desired and can be applied independently of each other respectively to the alloy, to the aluminium flat product and to the uses of the alloy or of the aluminium flat product.

According to one embodiment, the aluminium alloy has a Fe content of 1.4 to 1.7 wt. %, preferably 1.6 to 1.7 wt. %. It was found that particularly good forming properties are achieved with such an Fe content. According to an alternative embodiment, which is in particular suitable for less complexly formed parts, the aluminium alloy may also have an Fe content of at most 1.6 wt. %, in particular an Fe content in the range of 1.4 wt. % to 1.6 wt. %, for the benefit of greater strength, although at the expense of the formability.

According to a further embodiment, the aluminium alloy has a Si content of 0.15 to 0.35 wt. %. With such a Si content, the corrosion behaviour may be improved, in addition to the forming properties.

According to a further embodiment, the aluminium flat product is an aluminium strip, an aluminium foil or an aluminium sheet. Products of this type are particularly suitable for producing multi-layer aluminium-plastic composite parts which have one or a plurality of aluminium layers.

According to a further embodiment, the aluminium flat product has a thickness in the range of 0.02 mm to 0.7 mm, preferably in the range of 0.020 mm to 0.200 mm, in particular in the range of 0.020 mm to 0.140 mm. This thickness range provides a corresponding aluminium-plastic composite part with good stiffness properties, in particular bending and torsion stiffness with simultaneous weight and material cost optimisation.

According to a further embodiment, the aluminium flat product has the following mechanical properties, measured in soft state O according to EN 546-2:

Tensile strength Rm:>95 MPa, preferably>100 MPa,
Yield strength Rp0.2:>45 MPa and
Elongation at break A100:>25% in the case of a thickness
  of the sample body
  of 45 μm
  and/or
  >30%, preferably>35% in the case of a thickness of the sample body of 100 μm.

The tensile strength Rm, the yield strength Rp0.2 and the elongation at break A100 are determined according to DIN EN ISO 6892-1:2009.

It was found that with the previously described alloy, the above-mentioned mechanical properties may be achieved which in particular require good formability of aluminium flat products made from this alloy. Aluminium flat products of this type may thus be used particularly in production processes of aluminium-plastic composite parts which have formations with high degrees of forming such that aluminium-plastic composite parts with complex geometries can be produced in this manner.

According to a further embodiment, the ratio of the Fe content to the Si content of the aluminium alloy is between 4 and 10, in particular between 4 and 8. The Fe:Si ratio is preferably at least 7. The ratio is calculated from the respective contents in wt. %. The corrosion properties are positively influenced by an Fe:Si ratio in this range without the forming properties being impaired too much. The desired forming properties are no longer achieved with Fe:Si ratios lower than 7 and especially lower than 4. In contrast, an increased corrosion tendency may occur with Fe:Si ratios greater than 8 and in particular greater than 10.

According to a further embodiment, the ratio of the Fe content to the Mn content of the aluminium alloy is between 40 and 80, in particular between 50 and 80. The Fe:Mn ratio is preferably 60 at the most. The ratio is calculated from the respective contents in wt. %. An alloy with sufficient tensile strength (Rm) which can also be easily processed is achieved by a Fe:Mn ratio in this range. In the case of Fe:Mn ratios lower than 50 and in particular lower than 40, a steep drop off of the softening curve of the alloy results such that a defined heat treatment in order to achieve certain degrees of strength is made difficult.

Tests have shown that the advantageous mechanical properties (Rm>95 MPa, in particular>100 MPa, Rp0.2>45 MPa, A100>30%, in particular>35% in the case of 100 μm thickness and/or>25% in the case of 45 μm thickness) of the aluminium flat product can be reliably achieved with the previously described preferred ratios of the Fe content to the Si content and of the Fe content to the Mn content as well as by limiting the Mg content to 0.003 wt. %, preferably to 0.001 wt. %.

According to a further embodiment, the aluminium flat product has a yield strength Rp0.2 between 45 and 90 MPa. It has been shown that the yield strength of the aluminium flat product can be adjusted by corresponding heat treatment to such an advantageous value and namely in particular with virtually unchanged tensile strength and elongation at break. A yield strength in this range could be reached in the case of the described alloy for example by a heat treatment at a temperature in the range of 195° C. to 260° C., in particular 195° C. to 240° C. with a hold time of 2 hours, in particular at least 5 hours.

According to a further embodiment, the aluminium flat product is coated on one or both sides with an adhesive varnish layer, preferably with a PP adhesive varnish on an epoxide resin basis. The adhesive varnish layer may be applied for example very efficiently by a coil coating process on the aluminium flat product. Alternatively, the adhesive varnish layer may also be applied by spraying and immersing. Such an adhesive varnish layer enables improved adhesion of the aluminium flat product to the plastic of the aluminium-plastic composite part, in particular to the plastic-containing layers. The aluminium surface is further protected against corrosion by the adhesive varnish such that a synergetic effect is hereby achieved in the case of which the composite of the composite part is simultaneously strengthened and also the corrosion properties thereof improved.

A varnish is preferably used for the adhesive varnish coat which is activated by heat, for example by temperatures of more than 160° C. Activating the varnish is understood to mean that the varnish is transferred into a state in which it is bonded to other materials, for example a plastic layer of the aluminium-plastic composite part to be produced, and cured, optionally with subsequent cooling. The varnish may in particular be based on a thermoplastic plastic which softens under heat and optionally cross-links and thus bonds with a plastic-containing layer. Examples of varnishes of this type are for example varnishes on an epoxy basis (epoxy systems), polyester basis (polyester systems) or acrylate basis (acrylate systems). These varnishes are for example suitable for improving the adherence of the aluminium flat product to a plastic layer such as for example made of acrylonitrile butadiene styrene (ABS), polyvinyl chloride (PVC), polycarbonates (PC), polyamides (PA) or polyolefins, in particular polypropylene (PP).

Aluminium flat products, such as for example aluminium sheets or foils which have an adhesive varnish layer made of a heat-activatable adhesive varnish may advantageously be pressed in a heatable press with one or a plurality of plastic-containing layers to form a composite part. During the pressing, the press heats the plastic-containing layer or the adhesive varnish preferably to a temperature above the softening temperature or above the melting temperature of the plastic used. The plastic and the aluminium flat products are thereby bonded to each other via the adhesive varnish such that a fixed bond of the individual components of the composite part to each other and thus a very stable composite part are achieved.

Aluminium flat products coated on both sides in particular allow the production of a composite part with at least one inner aluminium layer. Such an inner aluminium layer may be used for example as a vapour barrier.

The high formability of the described aluminium flat products is also advantageous for such an inner aluminium layer since aluminium layers arranged in this manner are particularly highly stressed when forming the composite part. Correspondingly, the aluminium-plastic composite part has at least one inner aluminium layer according to one embodiment.

According to a further embodiment, the adhesive varnish layer has a thickness in the range of 3 to 30 µm, preferably of 5 to 10 µm and/or a grammage in the range of 3 to 30 g/m², preferably 5 to 10 g/m², further preferably 6 to 9 g/m². Very good adhesion between the aluminium layers and the plastic-containing layers of the composite part was achieved with these thicknesses or grammages with at the same time low consumption of adhesive varnish. Grammage is understood here as the weight of the dried adhesive varnish layer with regard to the surface (dry weight per area).

According to a further embodiment, the aluminium-plastic composite part is a multi-layer composite part with at least one aluminium layer and at least one plastic-containing layer. The aluminium-plastic composite part may have for example a plurality of aluminium layers and a plurality of plastic-containing layers which are arranged alternating in a stacking direction on top of each other. The mechanical properties of parts of this type can be adapted in a wide range to the respective purpose of use, in particular by selecting the number and arrangement of the individual layers, the composition and thickness of the plastic-containing layers, the thickness and the mechanical properties, in particular the strength, of the aluminium layers. Good mechanical properties may in particular be achieved with these composite parts with simultaneously low weight.

Particularly good adhesion between the aluminium flat product and the plastic in the composite part is achieved in that the aluminium-plastic composite part comprises polypropylene (PP) as the plastic, in particular comprises a PP-containing layer. The adhesive varnish is correspondingly preferably a PP adhesive varnish.

The previously described multi-layer composite parts can for example be produced by the individual layers being arranged in a stacking direction on top of each other and then being pressed together in a heated press. The layers may preferably be formed in the heated presses simultaneously into the desired target geometry of the composite part.

Preferably, at least one plastic-containing layer of the aluminium-plastic composite part is a fibre-containing layer. For example, the plastic-containing layer may have plastic fibres as binder and/or inorganic fibres such as for example glass fibres for reinforcement. Layers of this type provide the composite part with high stiffness and good acoustic insulating properties and at the same time with low density.

DETAILED DESCRIPTION OF THE INVENTION

Further embodiments 1 to 14 of a use and a further embodiment 15 of an aluminium alloy are described below. The following embodiments can be combined with each other and also with the previously described embodiments of the use or of the aluminium alloy.

1. Use of an aluminium alloy for an aluminium-plastic composite part or the production thereof, wherein the aluminium alloy has the following composition: Si: 0.05 to 0.35 wt. %, Fe: 1.3 to 1.6 wt. %, Cu:<0.02 wt. %, Mn: 0.015 to 0.035 wt. %, Mg:<0.001 wt. %, Cr:<0.02 wt. %, Ni:<0.02 wt. %, Zn:<0.03 wt. %, Ti:<0.03 wt. %, impurities individually up to 0.02 wt. %, in total up to 0.06 wt. %, the remainder being aluminium.
2. Use according to embodiment 1, wherein the aluminium alloy has a Fe content of 1.4 to 1.6 wt. % and/or a Si content of 0.15 to 0.35 wt. %.
3. Use according to embodiment 1 or 2, wherein the ratio of the Fe content to the Si content of the aluminium alloy is between 4 and 8.
4. Use according to any one of embodiments 1 to 3, wherein the ratio of the Fe content to the Mn content of the aluminium alloy is between 40 and 80.
5. Use of an aluminium flat product made from an alloy corresponding to one of the embodiments 1 to 4 for an aluminium-plastic composite part or the production thereof.
6. Use according to embodiment 5, wherein the aluminium flat product is an aluminium strip, an aluminium foil or an aluminium sheet.
7. Use according to embodiment 5 or 6, wherein the aluminium flat product has a thickness in the range of 0.02 mm to 0.7 mm, preferably in the range of 0.020 mm to 0.200 mm.
8. Use according to any one of embodiments 5 to 7, wherein the aluminium flat product has the following mechanical properties, measured in the soft state O according to EN 546-2: tensile strength Rm:>95 MPa, preferably>100 MPa, yield strength Rp0.2:>45 MPa and elongation at break A100:>25% in the case of a thickness of the sample body of 45 µm and/or>30%, preferably in the case of a thickness of the sample body of 100 µm.

9. Use according to any one of embodiments 5 to 8, wherein the aluminium flat product has a yield strength Rp0.2 between 45 and 90 MPa.
10. Use according to any one of embodiments 5 to 9, wherein the aluminium flat product is coated on one or both sides with an adhesive varnish layer, preferably with a PP adhesive varnish on an epoxide resin basis.
11. Use according to embodiment 10, wherein the adhesive varnish layer has a thickness in the range 3 to 30 μm, preferably 5 to 10 μm and/or a grammage in the range 5 to 10 g/m², preferably 6 to 9 g/m².
12. Use according to any one of embodiments 1 to 11, wherein the aluminium-plastic composite part is a multi-layer composite part with at least one aluminium layer and at least one plastic-containing layer, in particular a PP-containing layer.
13. Use according to embodiment 12, wherein at least one plastic-containing layer of the aluminium-plastic composite part is a fibre-containing layer.
14. Use according to embodiment 12 or 13, wherein the aluminium-plastic composite part has at least one inner aluminium layer.
15. Aluminium alloy, in particular for an aluminium-plastic composite part or the production thereof, wherein the aluminium alloy has the following composition: Si: 0.05 to 0.35 wt. %, Fe: 1.3 to 1.6 wt. %, Cu:<0.02 wt. %, Mn: 0.015 to 0.035 wt. %, Mg:<0.001 wt. %, Cr:<0.02 wt. %, Ni:<0.02 wt. %, Zn:<0.03 wt. %, Ti:<0.03 wt. %, impurities individually up to 0.02 wt. %, in total up to 0.06 wt. %, the remainder being aluminium.

In the context of the invention, tests were carried out which demonstrate the properties of the previously described alloy or the corresponding aluminium flat products.

For the tests, bars were cast and homogenised from the alloys 1 to 11 indicated in the table 1 below. The bars were initially hot rolled into hot strips with thicknesses in the range of 4 to 5 mm and then cold rolled into cold strips with end thicknesses in the range of 30 to 140 μm. Alloy 11 is a comparative alloy. Strips made from the alloys AA8079-D, AA8079-L, AA1200 and AA1050A used hitherto in automotive engineering were produced in a corresponding manner as additional comparative tests.

TABLE 1

(all data in wt. %)

| No. | Si | Fe | Cu | Mn | Mg | Cr | Ni | Zn | Ti | Al |
|---|---|---|---|---|---|---|---|---|---|---|
| 1 | 0.05 | 1.53 | — | 0.021 | 0.0006 | — | — | 0.01 | 0.02 | Remainder |
| 2 | 0.06 | 1.55 | — | 0.018 | 0.0006 | — | — | 0.01 | 0.02 | Remainder |
| 3 | 0.07 | 1.52 | — | 0.019 | 0.0007 | — | — | 0.01 | 0.02 | Remainder |
| 4 | 0.11 | 1.61 | 0.01 | 0.035 | 0.0004 | — | — | 0.01 | 0.02 | Remainder |
| 5 | 0.12 | 1.64 | 0.02 | 0.024 | 0.0007 | — | — | 0.01 | 0.02 | Remainder |
| 6 | 0.12 | 1.68 | 0.01 | 0.027 | 0.0002 | — | — | 0.01 | 0.02 | Remainder |
| 7 | 0.06 | 1.65 | 0.01 | 0.026 | 0.0004 | 0.01 | — | 0.02 | 0.02 | Remainder |
| 8 | 0.06 | 1.75 | 0.01 | 0.027 | 0.0006 | 0.02 | — | 0.02 | 0.02 | Remainder |
| 9 | 0.18 | 1.64 | 0.01 | 0.027 | 0.0006 | 0.02 | — | 0.02 | 0.02 | Remainder |
| 10 | 0.18 | 1.63 | 0.01 | 0.03 | 0.0008 | 0.02 | — | 0.02 | 0.02 | Remainder |
| 11 | 0.19 | 1.62 | 0.01 | 0.04 | 0.0007 | 0.03 | — | 0.02 | 0.03 | Remainder |

The tensile strength Rm, the yield strength Rp0.2 and the elongation at break (A50 for thicknesses≥100 μm or A100 for thicknesses≤100 μm) were measured for the cold strips, namely once in the roll-hard state H19 (EN 546-2) and once in the soft state 0 (EN 546-2) after heat treatment at 280° C. (Nos. 1 to 4) or 260° C. (Nos. 5 to 11) with a holding time of 2 hours. The results are indicated in Table 2.

As the results from the following Table 2 show, a significantly higher elongation at break in the soft state O and thus better formability is achieved with the alloys according to the invention than with the alloys from the prior art. Tests have further shown that the alloys according to the invention have satisfactory corrosion properties and can be processed easily. Particularly good results are achieved with the alloys 9 and 10 which have a preferred Fe:Si ratio in the range of 7 to 10.

TABLE 2

| | | State H19 | | | State O | | |
|---|---|---|---|---|---|---|---|
| Alloy | Thickness (μm) | Rm (MPa) | Rp0.2 (MPa) | A50/100 (%) | Rm (MPa) | Rp0.2 (MPa) | A50/100 (%) |
| No. 1 | 120 | 186 | 160 | 5.3 | 100 | 50 | 39.1 |
| | 45 | 181 | 146 | 2 | 100 | 45 | 26.5 |
| | 33 | 191 | 153 | 1.8 | 101 | 47 | 20.9 |
| No. 2 | 100 | 186 | 155 | 4.9 | 96 | 58 | 41.2 |
| | 55 | 179 | 146 | 3 | 97 | 50 | 30.4 |

TABLE 2-continued

| Alloy | Thickness (μm) | State H19 Rm (MPa) | State H19 Rp0.2 (MPa) | State H19 A50/100 (%) | State O Rm (MPa) | State O Rp0.2 (MPa) | State O A50/100 (%) |
|---|---|---|---|---|---|---|---|
| No. 3 | 130 | 191 | 154 | 3.9 | 101 | 50 | 36.4 |
|  | 70 | 191 | 160 | 3.2 |  |  |  |
| No. 4 | 140 | 212 | 163 | 4.4 | 104 | 61 | 38.3 |
|  | 80 | 216 | 167 | 2.5 | 105 | 48 | 34.1 |
| No. 5 | 70 | 206 | 160 | 2 | 101 | 50 | 31.1 |
|  | 35 | 203 | 149 | 4.3 | 101 | 60 | 12 |
| No. 6 | 40 | 193 | 142 | 3.7 | 106 | 56 | 29.5 |
| No. 7 | 100 | 191 | 142 | 3 | 107 | 61 | 40 |
|  | 40 | 180 | 138 | 2.4 | 97 | 42 | 27 |
| No. 8 | 80 | 188 | 134 | 4.5 | 95 | 40 | 47 |
|  | 40 | 175 | 122 | 4.3 | 96 | 44 | 26 |
| No. 9 | 80 | 194 | 141 | 6.8 | 97 | 48 | 45.6 |
|  | 45 | 197 | 145 | 4.8 | 97 | 48 | 33 |
| No. 10 | 70 | 192 | 143 | 3.5 | 102 | 50 | 38 |
|  | 45 | 194 | 144 | 3.2 | 102 | 49 | 28 |
| No. 11 | 70 | 194 | 146 | 2.9 | 109 | 53 | 17.6 |
| AA8079-D | 45 |  |  |  | 96 | 42 | 20.8 |
|  | 37 | 192 | 154 | 2 | 93 | 43 | 16.8 |
| AA8079-L | 45 | 178 | 145 | 2.3 | 83 | 35 | 17.1 |
| AA1200 | 37 | 158 | 133 | 2.9 | 66 | 36 | 9.4 |
| AA1050A | 45 |  |  |  | 67 | 33 | 9 |

The previously described, annealed cold strips (state O) made from the alloys according to the invention were coated after cooling to room temperature in the coil coating process on both sides with a PP adhesive varnish on an epoxide resin basis, i.e. with an adhesive varnish optimised for the adhesion to polypropylene (PP), and namely with a grammage (weight per area of the varnish after drying) in the range of 6 to 9 g/m².

In order to examine the suitability of the aluminium flat products produced in this way for the production of aluminium-plastic composite parts, they were respectively subjected to the test described below:

Strips were cut from the coated aluminium strips and sealed against 2 mm thick and 20 mm wide polypropylene strips (Xenopren® PP TD20, available from Chemists' Collective XENON, Rabień, Poland). To this end, one coated aluminium strip was respectively applied on one of the polypropylene strips such that an adhesive varnish layer of the aluminium strip was arranged on the side of the polypropylene strip. With an upper sealing jaw heated to 200° C. on the side of the aluminium strip and a lower unheated sealing jaw on the side of the polypropylene strip, the aluminium strip and the polypropylene strip were then pressed (sealed) together for 10 seconds with a force of 460 N. In the tests, sealing jaws were used with a width of 10 mm such that the aluminium strip was bonded to the polypropylene strip over a 10 mm×20 mm large sealed seam.

After cooling, the composite adhesion of the respective aluminium strip and polypropylene strip was tested with a peel test. For this purpose, the aluminium strip was bent on one side of the sealed seam along one of the 20 mm long side edges of the sealed seam by 180° and the polypropylene strip as well as the bent part of the aluminium strip were clamped into a load cell by means of which the force (peel force) required to release the aluminium strip from the polypropylene strip could be determined. In doing so, values of at least 90 N, partly even of at least 130 N were measured (in the case of a sealed seam width and length of 10 mm×20 mm).

The previously described tests show that the aluminium flat products according to the invention show very good adhesion to plastic elements such that they are particularly suitable for the production of aluminium-plastic composite parts.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising the steps of: providing an aluminium component from an aluminium alloy having the following composition:
   Si: 0.05 to 0.35 wt. %,
   Fe: 1.55 to 1.75 wt. %,
   Cu: ≤0.02 wt. %,
   Mn: 0.015 to 0.035 wt. %,
   Mg: ≤0.003 wt. %,
   Cr: ≤0.03 wt. %,
   Ni: ≤0.02 wt. %,
   Zn: ≤0.03 wt. %,
   Ti: ≤0.03 wt. %,
   impurities individually up to 0.05 wt. %, in total up to 0.15 wt. %, the remainder being aluminium; and
   combining the aluminium component with a plastic-containing component to produce an aluminium-plastic composite part, wherein the aluminium-plastic composite part is an automotive lightweight component.

2. The method according to claim 1, characterised in that the aluminium alloy has a Fe content of 1.6 to 1.7 wt. % and/or a Si content of 0.15 to 0.35 wt. %.

3. The method according to claim 1, characterised in that a ratio of the Fe content to the Si content of the aluminium alloy is between 4 and 10.

4. The method according to claim 1, characterised in that a ratio of the Fe content to the Mn content of the aluminium alloy is between 40 and 80.

5. The method of claim 1, characterized in that an aluminium flat product formed from the aluminium alloy is utilized as the aluminium component, wherein the aluminium flat product is an aluminium strip, an aluminium foil or an aluminium sheet.

6. The method according to claim 5, characterised in that the aluminium flat product has a thickness in the range of 0.02 mm to 0.7 mm.

7. The method according to claim 6, wherein the aluminium flat product has a thickness in the range of 0.020 mm to 0.200 mm.

8. The method according to claim 5, characterised in that the aluminium flat product has the following mechanical properties, measured in the soft state O according to EN 546-2:
   tensile strength Rm: >95 MPa,
   yield strength Rp0.2: >45 MPa and
   elongation at break A100: >25% in the case of a thickness of a sample body of 45 μm
   and/or
   >30%, in the case of a thickness of a sample body of 100 μm.

9. The method according to claim 8, wherein the aluminium flat product has tensile strength Rm of >100 MPa and/or elongation at break A100>35%, in the case of a thickness of the sample body of 100 μm, measured in the soft state O according to EN 546-2.

10. The method according to claim 5, characterised in that the aluminium flat product has a yield strength Rp0.2 between 45 and 90 MPa.

11. The method according to claim 5, characterised in that the aluminium flat product is coated on one or both sides with an adhesive varnish layer.

12. The method according to claim 11, characterised in that the adhesive varnish layer has a thickness in the range 3 to 30 μm and/or a grammage in the range 3 to 30 g/m².

13. The method according to claim 12, wherein the adhesive varnish layer has a thickness in the range 5 to 10 μm and/or a grammage in the range 6 to 9 g/m².

14. The method according to claim 1, characterised in that the aluminium-plastic composite part is a multi-layer composite part with at least one aluminium layer and at least one plastic-containing layer.

15. The method according to claim 14, wherein the combining step further comprises pressing the multi-layer composite part in a heated press to form the multi-layer composite part into a desired target geometry of the automotive lightweight component.

16. The method according to claim 14, characterised in that at least one plastic-containing layer of the aluminium-plastic composite part is a fibre-containing layer.

17. The method according to claim 14, characterised in that the aluminium-plastic composite part has at least one inner aluminium layer.

18. The method according to claim 1, wherein the aluminium alloy has a Fe content of 1.5 to 1.7 wt. % and/or a Cu content of ≤0.01 wt. % and/or a Mn content of 0.025 to 0.034 wt. %.

19. The method according to claim 1, wherein a ratio of the Fe content to the Si content of the aluminium alloy is between 7 and 10.

20. The method according to claim 1, wherein a ratio of the Fe content to the Mn content of the aluminium alloy is between 50 and 60.

* * * * *

UNITED STATES PATENT AND TRADEMARK OFFICE
CERTIFICATE OF CORRECTION

PATENT NO. : 10,792,892 B2  
APPLICATION NO. : 15/397330  
DATED : October 6, 2020  
INVENTOR(S) : Andreas Siemen et al.

Page 1 of 1

It is certified that error appears in the above-identified patent and that said Letters Patent is hereby corrected as shown below:

In the Claims

Column 12, Claim 18, Line 2, reads:  
minium alloy has a Fe content of 1.5 to 1.7 wt. % and/or a  
And should read:  
--minium alloy has a Fe content of 1.55 to 1.7 wt. % and/or a--

Signed and Sealed this  
Seventeenth Day of November, 2020

Andrei Iancu  
*Director of the United States Patent and Trademark Office*